L. V. GRILLET & J. B. TRUCHETET.
ELECTRICAL GENERATING SYSTEM.
APPLICATION FILED OCT. 18, 1911.

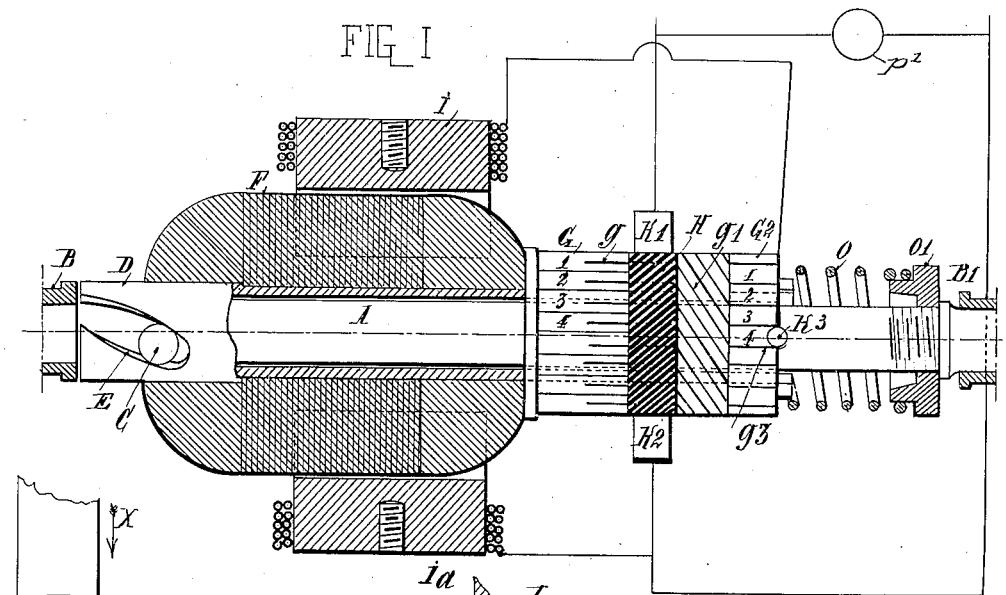
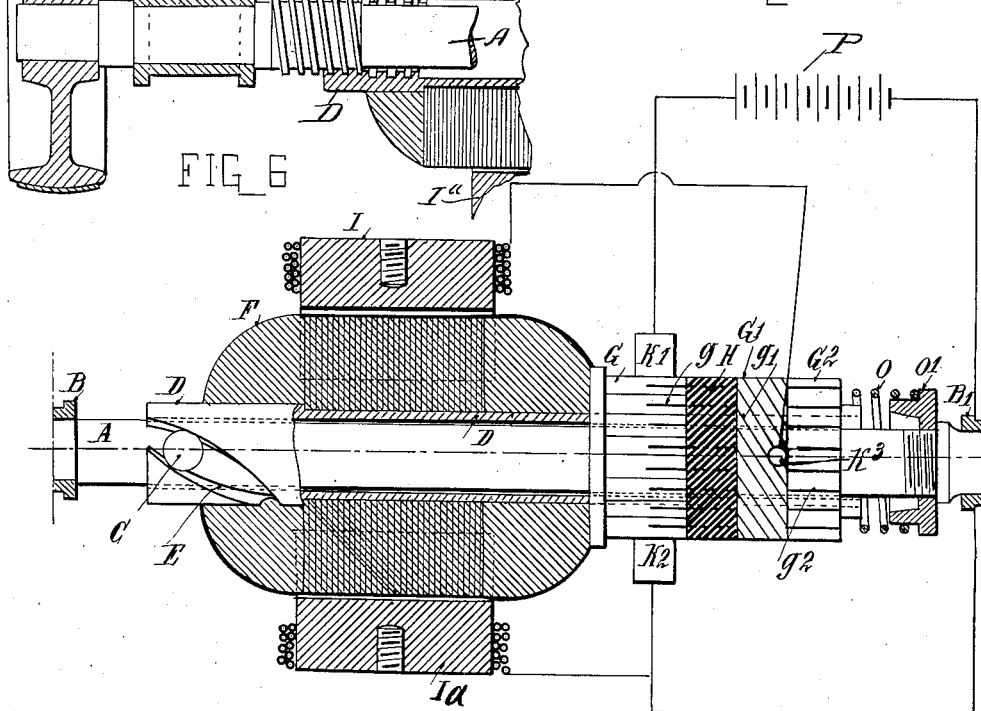

1,104,793.

Patented July 28, 1914.
2 SHEETS—SHEET 2.

WITNESSES
S. P. Buck.
L. E. Barkly.

INVENTORS
Leon Victor Grillet and Jean Baptiste Truchetet
per Frank L. Addleman
ATTORNEY.

UNITED STATES PATENT OFFICE.

LEON VICTOR GRILLET AND JEAN BAPTISTE TRUCHETET, OF PARIS, FRANCE.

ELECTRICAL GENERATING SYSTEM.

1,104,793. Specification of Letters Patent. Patented July 28, 1914.

Application filed October 18, 1911. Serial No. 655,325.

*To all whom it may concern:*

Be it known that we, LEON VICTOR GRILLET and JEAN BAPTISTE TRUCHETET, both citizens of the French Republic, residing at 61 Rue de Bretagne, Paris, in the Department of Seine, France, have invented a new and useful Electrical Generating System, of which the following is a specification.

The invention relates to automatic regulating devices particularly applicable to sets comprising dynamo electric machines and batteries.

One object of the invention is to produce a device capable of serving as a substitute for the control "make and break" switches previously employed.

More particularly defined the present invention comprises a dynamo electric machine the armature of which is movable along its shaft with regard to the field magnets, with the object of varying the output of the machine.

In one method of carrying out the invention a specially designed commutator is carried by the movable armature and is positively pushed in one direction by the movement of the armature and in the other by a compressed spring. This arrangement is adapted by regulation of the exciting current to enable the dynamo to supply constant current or E. M. F. throughout any range of speeds. For this purpose the commutator when displaced may make contact with the fixed brushes of the machine supplying the main current, and with an exciting brush fixed in the neutral plane between the poles but operating in the same plane of commutation as the main brushes owing to a certain angular displacement of the commutator segments toward the point of contact, the angular displacement being obtained by a suitable obliquity of the commutator segments between the parts contacting with the main brushes and the excitation brush. This arrangement is especially advantageous in its application to the charging of secondary batteries and for lighting motor cars, railway trains and the like.

Figure 3:
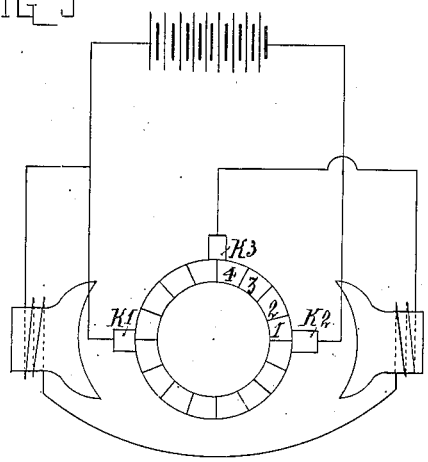
Figure 4:
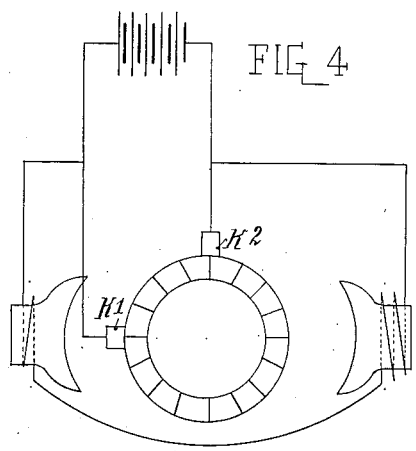
Figure 5:
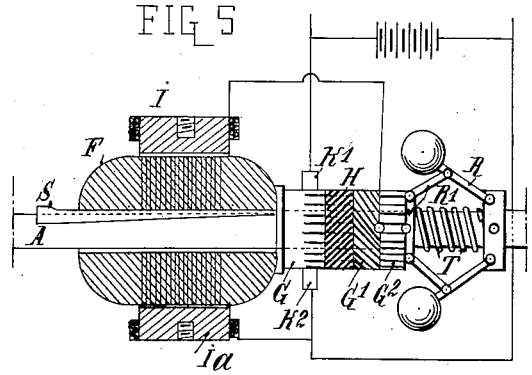

In the accompanying drawings: Figure 1 is a diagrammatic view of the automatic regulating device fitted with a special commutator in order to maintain the output of the machine constant by variation of the exciting current. This view shows the dynamo at rest with its main and exciting circuits broken. Fig. 2 is a view of the arrangement in Fig. 1 with the dynamo rotating and the main and exciting circuits closed. Fig. 3 is a diagrammatic cross section of the arrangement shown in Figs. 1 and 2, Fig. 4 illustrates a modification in which one of the main brushes also serves as the additional exciting brush, Fig. 5 shows a centrifugal governor applied to actuate the controlling device and Fig. 6 is a modified detail.

Referring to the drawings the shaft A of a dynamo illustrated as a shunt wound bipolar machine in Figs. 1 and 2 revolves in the bearings B, B' and carries a driving pulley A'. The pin or locking bolt, C called the engaging pin, passes through this shaft and both its ends engage with helicoidal grooves E, cut in a sleeve D mounted freely on the shaft A. This sleeve is extended to carry the armature with its winding F, the commutator G and an insulating ring H. The field windings and poles of the dynamo are represented at I and $I^a$, while the main brushes are shown at K', $K^2$, a consuming device at P' in Fig. 1 and a secondary battery at P in Fig. 2.

When the generator shaft A is stationary the parts of the machine occupy the position shown in Fig. 1. When the generator shaft revolves in the clock-wise direction looking from the left in Figs. 1 and 2 the sleeve D movable upon the shaft A is displaced to the position shown in Fig. 2 so that now the commutator G is under the brushes K' and $K^2$. Contact is made with them and the main circuit of the dynamo through the consuming device P' or the secondary batteries P is completed.

The sliding of the sleeve D along the shaft A is primarily caused by means of the pin C on rotation of the generator shaft operating against the edge of the helicoidal groove E and pushing the sleeve along. Afterward the movement of the sleeve is completed by means of the electromagnetic reactions. The movement of the sleeve D may be limited by means of a stop fixed on the shaft A, or a spring may be employed.

When the secondary battery is being charged and is connected up with the dynamo as shown in Fig. 2, if the pressure of the latter falls below that of the battery or if the dynamo stops the current of the battery will reverse and will discharge through the dynamo which will run as a motor. The armature B being driven around re-acts on the pin C and drives the sleeve D which carries the commutator into the off position and breaks the charging circuit. The parts of the apparatus have then returned to the position illustrated in Fig. 1, that is to say, the ring H has returned to underneath the main brushes K' and K² and the circuit is thus interrupted.

In order to provide means to regulate the output the commutator G is extended on the outer side of the insulating ring H as is seen at G' and G². This extension is constructed in a special manner in order to contact with a fixed exciting brush K³ connected to the field windings.

The commutator segments can be seen in the parts G, G', G² of the commutator but are buried in and pass through the insulating ring H. These segments are parallel to the axis of the generator shaft in the parts G, G² but they are arranged obliquely in the part G', so that one and the same blade (for instance $g$) passes through the insulating ring H, is continued at $g'$ in the part G', and at $g^2$ in the part G². The obliquity of the parts in G' is arranged in the example chosen so that the part $g^2$ is displaced through an angle of 90° relatively to the part $g$. By this construction the exciting brush K³ may be placed in the neutral plane (seen in Fig. 3) mid-way between the poles but by reason of the obliquity of the part G' it makes contact with the commutator segment in the same plane of commutation as the main brushes K', K².

When the generator is at rest the parts of the apparatus take up the position shown in Fig. 1. The main and exciting circuits are broken because in this position both of the main brushes K', K² rest on the insulating ring H. The exciting brush K³ although it is in contact with the commutator segments in the part G² cannot receive any exciting current because the exciting circuit is broken at the other end at the brush K². When the generator shaft is rotating the sleeve D is moved and carries with it the commutator so that the part G makes contact with the main brushes K', K² and the exciting brush K³ collects exciting current from the part G² of the commutator, as may be readily seen from a consideration of Fig. 2. If owing to a sudden increase of speed of the dynamo the E. M. F. current and power increase the sleeve D and the armature will tend to be still further moved by the unscrewing action of the pin C and also by an attraction between the armature and the poles. After this motion the main brushes K', K² still remain in contact with the part G of the commutator but the exciting brush K³ leaves the part G² and enters upon the part G' and the spring O arranged between the end of the movable sleeve D and an adjustable stop O' on the shaft A is compressed. This stop may be adjusted for instance by a screw on the shaft so as to vary the stress in the spring O.

As long as the current supplied by the generator does not reach a predetermined maximum value the exciting brush K³ remains in contact with the part G² and does not come into contact with the part G', that is to say, it remains in the plane of commutation of the main brushes as at the beginning of the operation, but as soon as the current exceeds this predetermined value the sleeve D is moved to such an extent that the brush K³ leaves the part G² and begins to make contact with the part G' in which the commutator segments are oblique as is shown in Fig. 2. The result of this action is that the exciting brush K³ is caused to make contact with a commutator segment which is no longer electrically diametrically opposite the brush K². Hence a smaller voltage is applied to the exciting winding on the poles I and Iᵃ. As soon as the current returns to its former value or falls below it, the spring O will operate to return the sleeve D so that the brush K³ again operates upon the part G² and the excitation is returned to its former value. By this means an excitation is obtained which is automatically regulated in dependence upon the armature torque so that the current taken from the armature never exceeds a predetermined value.

Obviously similar results to the above may be obtained if the separate exciting brush is dispensed with and the main brush K² is put in its place (see Fig. 4). In this case the field winding may be a shunt across the main brushes K' K² or may be a series or a compound winding. The regulation of the main current would not only be effected by varying the excitation as described above, but it would also be directly controlled by the brush K² being moved on to the part G' as in the case above for the exciting brush K³.

The construction of the apparatus may be varied. For example, the sleeve D may carry a screw near its end (in place of the slots E) which will engage with a screw-threaded part of the shaft A which replaces the driving pin C, as seen in Fig. 6. The invention can also be varied by making the sleeve D movable longitudinally on the shaft A under the action of a centrifugal governor. Fig. 5 illustrates diagrammatically this arrangement. A centrifugal governor R rotated by the shaft A carries the moving sleeve R' directly connected to the commutator and armature. In this case the armature core rotates with the generator shaft A and slides upon the feather S on the shaft which serves as a driving connection. As before, the spring T is provided for returning the apparatus to the off position when the generator is at rest.

What we claim is:

1. In an electrical generator, the combination of a field structure, an armature, a commutator having its segments axial at its ends, but oblique between the ends, a brush contacting with the axial portion thereof, but having longitudinal motion relatively thereto and a brush moving on the oblique portion.

2. In an electrical generator the combination of a field structure, an axially moving armature, a commutator rigidly connected thereto and having its segments axial at its ends but oblique between the ends in order that it may coöperate with the brushes of the generator to regulate the supply of said armature upon axial movement of said commutator.

3. In an electrical generator, the combination of a field structure, an axially-movable armature, a commutator rigidly connected thereto, a pair of brushes contacting with said commutator, means for varying the number of commutator segments embraced by said brushes upon axial movement of the armature, and means for causing axial movement of said armature with variation of speed thereof.

4. In an electrical generator, the combination of a field structure, an axially-movable armature, a commutator rigidly connected thereto and having its segments axial at its ends but oblique between the ends, a pair of brushes, one contacting with the axial segments at one end of said commutator, and the other contacting normally with the axial segments at the opposite end of said commutator, but adapted upon axial movement of the armature to contact with the oblique segments at the middle portion of the commutator in order to vary the number of segments embraced by the pair.

5. In an electrical generator, the combination of a field structure, an armature, a commutator rigidly connected thereto, a pair of brushes contacting with said commutator, a field winding upon said field structure in electrical connection with said brushes, and means for varying the number of commutator segments embraced by said brushes upon axial movement of said armature and commutator.

In testimony whereof we have signed our names to this specification in the presence of two subscribing witnesses.

LEON VICTOR GRILLET.
JEAN BAPTISTE TRUCHETET.

Witnesses:
PAUL CAQUET,
H. C. COXE.